United States Patent
Akita et al.

(10) Patent No.: US 7,965,689 B2
(45) Date of Patent: Jun. 21, 2011

(54) REFERENCE SEQUENCE CONSTRUCTION FOR FAST CELL SEARCH

(75) Inventors: Hidenori Akita, Tikyo (JP); Masaya Fukuta, Yokohama (JP)

(73) Assignee: Motorola Mobility, Inc., Libertyville, IL (US)

( * ) Notice: Subject to any disclaimer, the term of this patent is extended or adjusted under 35 U.S.C. 154(b) by 1071 days.

(21) Appl. No.: 11/747,988

(22) Filed: May 14, 2007

(65) Prior Publication Data
US 2008/0285433 A1    Nov. 20, 2008

(51) Int. Cl.
H04J 3/00    (2006.01)

(52) U.S. Cl. ........ 370/336; 370/343; 370/324; 370/350; 375/260; 455/502

(58) Field of Classification Search ................... 370/343, 370/503–508, 204, 336; 375/224
See application file for complete search history.

(56) References Cited

U.S. PATENT DOCUMENTS

| | | | | |
|---|---|---|---|---|
| 7,693,123 | B2 * | 4/2010 | Rudolf | 370/342 |
| 2005/0169349 | A1 | 8/2005 | Hwang et al. | |
| 2005/0226140 | A1 | 10/2005 | Zhuang et al. | |
| 2006/0187887 | A1 | 8/2006 | Kim et al. | |
| 2007/0133386 | A1 | 6/2007 | Kim et al. | |
| 2007/0133390 | A1 * | 6/2007 | Luo et al. | 370/208 |
| 2008/0107086 | A1 * | 5/2008 | Fukuta et al. | 370/335 |
| 2009/0185541 | A1 * | 7/2009 | Tanno et al. | 370/336 |
| 2009/0323642 | A1 * | 12/2009 | Tanno et al. | 370/336 |
| 2010/0091907 | A1 * | 4/2010 | Noh et al. | 375/302 |
| 2010/0098031 | A1 * | 4/2010 | Charbit | 370/336 |

FOREIGN PATENT DOCUMENTS

| | | |
|---|---|---|
| EP | 1065825 A2 | 1/2001 |
| WO | W02003085855 A1 | 10/2003 |
| WO | W02006023423 A2 | 3/2006 |
| WO | W02007136931 A2 | 11/2007 |

OTHER PUBLICATIONS

3GPP document, R1-063302, NTT DoCoMo, Mitsubishi Electric, Panasonic, "SCH Sequence Configuration for E-UTRA Downlink," 3GPP TSG RAN WG1 Meeting # 47, Riga, Latvia, Nov. 6-10, 2006.
Sharma, et al., "Fast Cell Synchronization for Beyond 3G OFDMA based System," 2006 IFIP International Conference on Wireless and Optical Communications Networks, Apr. 11-13, 2006, pp. 1-5.
Kwang, et al., "A Preamble-Based Cell Searching Technique for OFDM Cellular Systems," Vehicular Technology Conference, Oct. 6-9, 2003, pp. 2471-2475.
Lee, et al., "OFDMA Uplink Ranging for IEEE 802.16e Using Modified Generalized Chirp-Like Polyphase Sequences," 2005 1st IEEE/IFIP International Conference in Central Asia on Internet, Sep. 26-28, 2005, pp. 1-5.
Motorola contribution (R1-061711), "Enhancement of SCH Structure," for 3GPP TSG RANI LTE Ad Hoc, Cannes, France, Jun. 27-30, 2006, pp. 1-6.

(Continued)

*Primary Examiner* — Kamran Afshar
*Assistant Examiner* — Khawar Iqbal (57) ABSTRACT

A method and apparatus for fast cell search based on a chirp reference signal transmission is disclosed herein. A primary synchronization channel (P-SCH) and two secondary synchronization channels (S-SCH1 and S-SCH2) will be utilized. S-SCH1 will comprise a reference sequence having a first index value and S-SCH2 will comprise a reference sequence having a second index value. S-SCH1 and S-SCH2 will be scrambled with a first and a second scrambling code, respectively. The second scrambling code will be based on the first index value.

6 Claims, 8 Drawing Sheets

OTHER PUBLICATIONS

Motorola contribution (R1-062070), "SCH Structure and Sequence for EUTRA Downlink," for 3GPP TSG RAN1 #46, Tallinn, Estonia, Aug. 28-Sep. 1, 2006, pp. 1-5.

SHRCWC, RITT contribution (R1-061140), Consideration on Multi-Cell interface for SCH Design in Cell Search and TP, for 3GPP RAN WG1 #45, Shanghai, China, May 8-12, 2006. pp. 1-7.

Carol Emery, "PCT/US2007/082190—PCT International Search Report and Written Opinion," WIPO, ISA/EP, European Patent Office, Rijswijk, Netherlands, Apr. 23, 2008.

Motorola, Inc., "R1-062069—Synch Sequence e-mail Reflector Summary," 3GPP TSG RAN1, #46, Tallinn, Estonia, Aug. 28-Sep. 1, 2006, 21 pp.

Higuchi, et al., "RCS2006-35—Physical Channel Strucdtures and Cell Search Method for Scalable Bandwidth for OFDM Radio Access in Evolved UTRA Downlink," IEICE Tec. Rep., vol. 106, No. 119, Jun. 2006, pp. 1-6.

Nagata, et al., "RCS1006-152—Comparison on Cell Search Time Performance between Hierarchical and Non-Hierarchical Synchronization Channels in OFDM Based Evolved UTRA Downlink," IEICE Tec. Rep., vol. 106, No. 305, Oct. 2006, pp. 113-117.

Interdigital, "Further Consideration on Cell Search for E-UTRA", RI-071102, 3GPP TSG RANI #48, St. Louis, US, Feb. 2007.

Etri,"S-SCH structure for EUTRA cell search.", RI-070750, 3GPP TSG RANI WGI #48, St. Louis, USA, Feb. 2007.

Qualcomn Europe,"Hypothesis partitioning for initial cell search-link performance.", RI-070650, 3GPP TSG-RAN WGI #48, St. Louis, USA, Feb. 2007.

Tanno,M et al."Physical Channel Structures and Cell Search Method for Scalable Bandwidth for OFDM Radio Access in Evolved UTRA Downlink.", In: Wireless Communications and Networking Conference, 2007.WCNC, IEEE, Mar. 2007, pp. 1506-1511.

Patent Cooperation Treaty, International Search Report and Written Opinion of the International Searching Authority for International Application No. PCT/US2008/062210 (CML04901M), Aug. 26, 2008, 8 pages.

* cited by examiner

REFERENCE SEQUENCE CONSTRUCTION FOR FAST CELL SEARCH

FIELD OF THE INVENTION

The present invention relates generally to fast cell search, and in particular to a method and apparatus for fast identification of a service cell or sector during initial or periodic access, or handover in a mobile communication system.

BACKGROUND OF THE INVENTION

In a mobile cellular network, the geographical coverage area is divided into many cells, each of which is served by a base station (BS). Each cell can also be further divided into a number of sectors. When a mobile station (MS) is powered up, it needs to search for a BS to register with. Also, when the MS finds out that the signal from the current serving cell becomes weak, it should prepare for a handover to another cell/sector. Because of this, the MS is required to search for a good BS to communicate with, likely among a candidate list provided by the current serving cell. The ability to quickly identify a BS to do initial registration or handover is important for reducing the processing complexity and thus lowering the power consumption.

The cell search function is often performed based on a cell-specific reference signal (or preamble) transmitted periodically. A straightforward method is to do an exhaustive search by trying to detect each reference signal and then determine the best BS. There are two important criteria when determining reference sequences for cells or sectors. First, the reference sequences should allow good channel estimation to all the users within its service area, which is often obtained through a correlation process with the reference of the desired cell. In addition, since a mobile will receive signals sent from other sectors or cells, a good cross correlation between reference signals is important to minimize the interference effect on channel estimation to the desired cell.

Just like auto-correlation, the cross-correlation between two sequences is a sequence itself corresponding to different relative shifts. Precisely, the cross-correlation at shift-d is defined as the result of summing over all entries after an element-wise multiplication between a sequence and another sequence that is conjugated and shifted by d entries with respect to the first sequence. "Good" cross correlation means that the cross correlation values at all shifts are as even as possible so that after correlating with the desired reference sequence, the interference can be evenly distributed and thus the desired channel can be estimated more reliably. Minimization of the maximal cross-correlation values at all shifts, which is reached when they are all equal, is refer to as "optimal" cross correlation. Therefore, a need exists for a method and apparatus for a fast cell search technique that utilizes a reference sequence having good cross correlation and good auto-correlation.

DETAILED DESCRIPTION OF THE DRAWINGS

To address the above-mentioned need, a method and apparatus for fast cell search based on a reference signal transmission is disclosed herein. In particular, a primary synchronization channel (P-SCH) and two secondary synchronization channels (S-SCH1 and S-SCH2) will be utilized. S-SCH1 will comprise a reference sequence having a first index value and S-SCH2 will comprise a reference sequence having a second index value. S-SCH1 and S-SCH2 will be scrambled with a first and a second scrambling code, respectively. The second scrambling code will be based on the first index value. For example, if S-SCH1 comprises a generalized chirp-like (GCL) sequence with an index value of 45, S-SCH2 will be scrambled with a scrambling code based on index value 45. Therefore, the second scrambling code's index value will correspond to the S-SCH1 index value.

The present invention encompasses a method comprising the steps of transmitting a primary synchronization channel (P-SCH) in a frame and transmitting a first secondary synchronization channel (S-SCH1) in the frame. The S-SCH1 comprises a first sequence having a first index value and the first sequence is scrambled with a first scrambling code. A second secondary synchronization channel (S-SCH2) is transmitted in the frame, where the S-SCH2 comprises a second sequence having a second index value and the second sequence is scrambled with a second scrambling code that is based on the first index value.

The present invention additionally encompasses a method comprising the steps of receiving a primary synchronization channel (P-SCH) in a frame and receiving a first sequence via a first secondary synchronization channel (S-SCH1) in the frame. The first sequence has a first index value and is scrambled with a first scrambling code. A second sequence is received via a second secondary synchronization channel (S-SCH2) in the frame. The second sequence has a second index value and is scrambled with a second scrambling code that is based on the first index value. Both the first and the second secondary synchronization channels are used for determining cell-specific information.

The present invention additionally encompasses an apparatus comprising first multiplication circuitry receiving a first sequence having a first index value and outputting the first sequence scrambled with a first scrambling code. The apparatus additionally comprises second multiplication circuitry receiving a second sequence and outputting the second sequence scrambled with a second scrambling code. The second scrambling code is based on the first index value. The apparatus additionally comprises transmission circuitry transmitting the first and the second scrambled sequences as a first and a second secondary synchronization channel.

The present invention additionally encompasses an apparatus comprising a receiver receiving a first scrambled sequence having a first index value as part of a first synchronization channel (S-SCH1), the receiver also receiving a second scrambled sequence having a second index value as part of a second synchronization channel (S-SCH2). First de-scrambling circuitry is provided for de-scrambling the first scrambled sequence with a first de-scrambling code. Finally, second de-scrambling circuitry is provided for de-scrambling the second scrambled sequence with a second de-scrambling code, wherein the second de-scrambling code is based on the first index value.

Although the following text will be described with GCL sequences being utilized for S-SCH1 and S-SCH2, one of ordinary skill in the art will recognize that other sequences may be used instead. For example, a Hadmard sequence, Zadoff-Chu sequence, Walsh sequence, or M-sequence can be applicable for both S-SCH sequences. Such sequences can act as a complete cell ID or partial cell ID or other cell-specific information.

Figure 1:
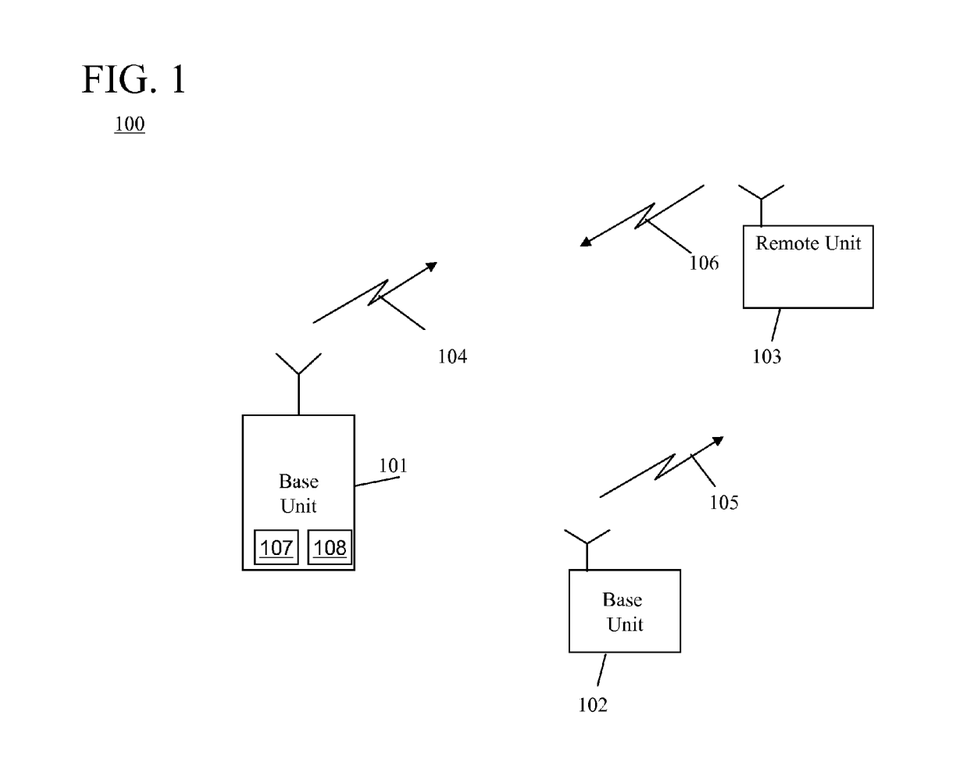
FIG. 1 is a block diagram of a communication system.

Turning now to the drawings, where like numerals designate like components, FIG. 1 is a block diagram of communication system 100 that utilizes reference transmissions. Communication system 100 utilizes an Orthogonal Frequency Division Multiplexing (OFDM) protocol; however in alternate embodiments communication system 100 may utilize other digital cellular communication system protocols such as a Code Division Multiple Access (CDMA) system protocol, a Frequency Division Multiple Access (FDMA) system protocol, a Spatial Division Multiple Access (SDMA) system protocol or a Time Division Multiple Access (TDMA) system protocol, or various combinations thereof.

As shown, communication system 100 includes base unit 101 and 102, and remote unit 103. A base unit or a remote unit may also be referred to more generally as a communication unit. The remote units may also be referred to as mobile units. A base unit comprises a transmit and receive unit that serves a number of remote units within a sector. As known in the art, the entire physical area served by the communication network may be divided into cells, and each cell may comprise one or more sectors. When multiple antennas are used to serve each sector to provide various advanced communication modes (e.g., adaptive beamforming, transmit diversity, transmit SDMA, and multiple stream transmission, etc.), multiple base units can be deployed. These base units within a sector may be highly integrated and may share various hardware and software components. For example, all base units co-located together to serve a cell can constitute what is traditionally known as a base station. Base units 101 and 102 transmit downlink communication signals 104 and 105 to serving remote units on at least a portion of the same resources (time, frequency, or both). Remote unit 103 communicates with one or more base units 101 and 102 via uplink communication signal 106. A communication unit that is transmitting may be referred to as a source communication unit. A communication unit that is receiving may be referred to as a destination or target communication unit.

It should be noted that while only two base units and a single remote unit are illustrated in FIG. 1, one of ordinary skill in the art will recognize that typical communication systems comprise many base units in simultaneous communication with many remote units. It should also be noted that while the present invention is described primarily for the case of downlink transmission from multiple base units to multiple remote units for simplicity, the invention is also applicable to uplink transmissions from multiple remote units to multiple base units. It is contemplated that network elements within communication system 100 are configured in well known manners with processors, memories, instruction sets, and the like, which operate in any suitable manner to perform the function set forth herein.

Figure 2:
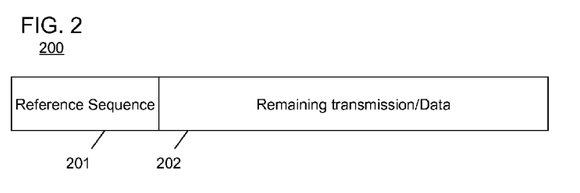
FIG. 2 illustrates reference signal transmission for the communication system of FIG. 1.

As discussed above, reference assisted modulation is commonly used to aid in many functions such as channel estimation and cell identification. With this in mind, base units 101 and 102 transmit reference sequences at known time intervals as part of their downlink transmissions. Remote unit 103, knowing the set of sequences that different cells can use and the time interval, utilizes this information in cell search and channel estimation. Such a reference transmission scheme is illustrated in FIG. 2. As shown, downlink transmissions 200 from base units 101 and 102 typically comprise reference sequence 201 followed by remaining transmission 202. The same or a different sequence can show up one or multiple times during the remaining transmission 202. Thus, each base unit within communication system 100 comprises reference channel circuitry 107 that transmits one or more reference sequences along with data channel circuitry 108 transmitting data.

It should be noted that although FIG. 2 shows reference sequence 201 existing at the beginning of a transmission, in various embodiments of the present invention, the reference channel circuitry may include reference sequence 201 anywhere within downlink transmission 200, and additionally may be transmitted on a separate channel. Remaining transmission 202 typically comprises transmissions such as, but not limited to, sending information that the receiver needs to know before performing demodulation/decoding (so called control information) and actual information targeted to the user (user data).

As discussed above, it is important for any reference sequence to have optimal cross-correlation. With this in mind, communication system 100 utilizes reference sequences constructed from distinct "classes" of chirp sequences with optimal cyclic cross-correlation although in alternate embodiments of the present invention other sequences may be used instead.

The construction of such reference sequences is described below. In a preferred embodiment of the invention, the method for fast cell search is based on such reference sequences.

Construction of a Set of Reference Sequences to Use Within a Communication System In one embodiment, the time domain reference signal is an Orthogonal Frequency Division Multiplexing (OFDM) symbol that is based on N-point FFT. A set of length-$N_P$ sequences are assigned to base units in communication system 100 as the frequency-domain reference sequence (i.e., the entries of the sequence will be assigned onto a set of $N_p$ ($N_p <= N$) reference subcarriers in the frequency domain). The spacing of these reference subcarriers is preferably equal (e.g., 0, 1, 2, etc. in subcarrier(s)). The final reference sequences transmitted in time domain can be cyclically extended where the cyclic extension is typically longer than the expected maximum delay spread of the channel ($L_D$). In this case, the final sequence sent has a length equal to the sum of N and the cyclic extension length $L_{CP}$. The cyclic extension can comprise a prefix, postfix, or a combination of a prefix and a postfix. The cyclic extension is an inherent part of the OFDM communication system. The inserted cyclic prefix makes the ordinary auto- or cross-correlation appear as a cyclic correlation at any shift that ranges from 0 to $L_{CP}$. If no cyclic prefix is inserted, the ordinary correlation is approximately equal to the cyclic correlation if the shift is much smaller than the reference sequence length.

The construction of the frequency domain reference sequences depends on at least two factors, namely, a desired number of reference sequences needed in a network (K) and a desired reference length ($N_p$). In fact, the number of reference sequences available that has the optimal cyclic cross-correlation is P−1 where P is the smallest prime factor of $N_p$ other than "1" after factoring $N_p$ into the product of two or more prime numbers including "1". For example, the maximum value that P can be is $N_p$−1 when $N_p$ is a prime number. But when $N_p$ is not a prime number, the number of reference sequences often will be smaller than the desired number K. In order to obtain a maximum number of sequences, the reference sequence will be constructed by starting with a sequence whose length $N_G$ is a prime number and then performing modifications. In the preferred embodiment, one of the following two modifications is used:
 1. Choose $N_G$ to be the smallest prime number that is greater than $N_p$ and generate the sequence set. Truncate the sequences in the set to $N_p$; or
 2. Choose $N_G$ to be the largest prime number that is smaller than $N_p$ and generate the sequence set. Repeat the beginning elements of each sequence in the set to append at the end to reach the desired length $N_p$.

The above design of requiring $N_G$ to be a prime number will give a set of $N_G$−1 sequences that has ideal auto correlation and optimal cross correlation. However, if only a smaller number of sequences is needed, $N_G$ does not need to be a prime number as long as the smallest prime factor of $N_G$ excluding "1" is larger than K.

When a modification such as truncating or inserting is used, the cross-correlation will not be precisely optimal anymore. However, the auto- and cross-correlation properties are still acceptable. Further modifications to the truncated/extended sequences may also be applied, such as applying a unitary transform to them.

It should also be noted that while only sequence truncation and cyclic extension were described above, in alternate embodiments of the present invention there exist other ways to modify the GCL sequences to obtain the final sequences of the desired length. Such modifications include, but are not limited to extending with arbitrary symbols, shortening by puncturing, etc. Again, further modifications to the extended/punctured sequences may also be applied, such as applying a unitary transform to them.

As discussed above, in the preferred embodiment of the present invention Generalized Chirp-Like (GCL) sequences are utilized for constructing reference sequences. There are a number of "classes" of GCL sequences and if the classes are chosen carefully (see GCL property below); sequences with those chosen classes will have optimal cross-correlation and ideal autocorrelation. Class-u GCL sequence (S) of length $N_G$ are defined as:

$$S_u = (a_u(0)b, a_u(1)b, \ldots, a_u(N_G-1)b), \quad (1)$$

where b can be any complex scalar of unit amplitude and $$a_u(k) = \exp\left(-j2\pi u \frac{k(k+1)/2 + qk}{N_G}\right), \quad (2)$$

where,
u=1, ... $N_G$−1 is known as the "class" of the GCL sequence,
k=0, 1, ... $N_G$−1 are the indices of the entries in a sequence,
q=any integer.

Each class of GCL sequence can have infinite number of sequences depending on the particular choice of q and b, but only one sequence out of each class is used to construct one reference sequence. Notice that each class index "u" produces a different phase ramp characteristic over the elements of the sequence (i.e., over the "k" values).

It should also be noted that if an $N_G$-point DFT (Discrete Fourier Transform) or IDFT (inverse DFT) is taken on each GCL sequence, the member sequences of the new set also have optimal cyclic cross-correlation and ideal autocorrelation, regardless of whether or not the new set can be represented in the form of (1) and (2). In fact, sequences formed by applying a matrix transformation on the GCL sequences also have optimal cyclic cross-correlation and ideal autocorrelation as long as the matrix transformation is unitary. For example, the $N_G$-point DFT/IDFT operation is equivalent to a size-$N_G$ matrix transformation where the matrix is an $N_G$ by $N_G$ unitary matrix. As a result, sequences formed based on unitary transformations performed on the GCL sequences still fall within the scope of the invention, because the final sequences are still constructed from GCL sequences. That is, the final sequences are substantially based on (but are not necessarily equal to) the GCL sequences.

If $N_G$ is a prime number, the cross-correlation between any two sequences of distinct "class" is optimal and there will $N_G$−1 sequences ("classes") in the set (see properties below). When a modification such as truncating or inserting is used, the modified reference sequence can be referred to as nearly-optimal reference sequences that are constructed from GCL sequences.

The original GCL sequences have the following cross correlation property:
Property: The absolute value of the cyclic cross-correlation function between any two GCL sequences is constant and equal to $1/\sqrt{N_G}$, when $|u_1-u_2|$, $u_1$ and $u_2$ are relatively prime to $N_G$.

The reference sequences have a lower peak-to-average ratio (PAPR) than the PAPR of data signals that are also transmitted by a communication unit. The low PAPR property of the reference signal enables reference channel circuitry 107 to transmit the reference signal with a higher power than the data in order to provide improved signal-to-noise/interference ratio on the reference signal received by another communication unit, thereby providing improved channel estimation, synchronization, etc.

Assignment of Reference Sequences Within a communication System

Each communication unit may use one or multiple reference sequences any number of times in any transmission interval or a communication unit may use different sequences at different times in a transmission frame. Additionally, each communication unit can be assigned a different reference sequence from the set of K reference sequences that were designed to have nearly-optimal auto correlation and cross correlation properties. One or more communication units may also use one reference sequence at the same time. For example where multiple communication units are used for multiple antennas, the same sequence can be used for each signal transmitted form each antenna. However, the actual signals may be the results of different functions of the same assigned sequence. Examples of the functions applied are circular shifting of the sequence, rotating the phase of the sequence elements, etc.

Figure 3:
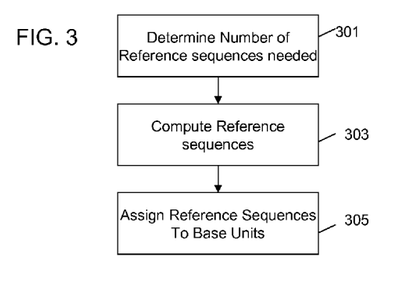
FIG. 3 is a flow chart showing reference sequence assignment for the communication system of FIG. 1.

FIG. 3 is a flow chart showing the assignment of reference codes to various base units within communication system 100. The logic flow begins at step 301 where a number of needed reference sequences (K), desired reference length ($N_p$) and a candidate length ($N_G$) of each reference sequence are determined. Based on $N_p$ and $N_G$, the reference sequences are computed (step 303). As discussed above, in one embodiment of the present invention the reference sequences are constructed from the Generalized Chirp-Like (GCL) sequences of length $N_p$, with each GCL sequence being defined as shown in equation (1). Finally, at step 305, the reference sequences are assigned to base units within communication system 100. It should be noted that each base unit may receive more than one reference sequence from the K available reference sequences. However, at a minimum a first base unit is assigned a first reference sequence taken from a group of sequences while a second base unit is assigned a differing reference sequence from the group of sequences. Alternatively, if the first and second base use orthogonal sets of subcarriers for the sequences, the same reference sequence can be assigned to the second base (then a cell can be identified by the combination of the sequence index and the subcarrier offset used). During operation, reference channel circuitry within each base unit will transmit the reference sequence as part of an overall strategy for coherent demodulation. Particularly, each remote unit within communication with the base units will receive the reference sequence and utilize the reference sequence for many functions, such as channel estimation as part of a strategy for coherent demodulation of the received signal.

Fast Cell Search Allowed by the GCL-based Reference Design:

This section shows how cell search can benefit from the above-described reference sequence design. While the detailed description uses an OFDM system with the elements of a sequence being mapped onto OFDM subcarriers for transmission, the invention is also applicable to other configurations, such as a single carrier system where the elements of a sequence are mapped onto different symbol periods or chip periods in the time domain.

First, assume the OFDM timing and frequency offset has been estimated and corrected, even though the invention is robust to timing and frequency errors. It is usually more efficient to acquire the coarse timing and frequency first by using other known characteristics of the downlink signal (e.g., special sync symbols, special symbol symmetry properties, or the like) or prior-art synchronization methods. From the correct or coarse timing point, a block of N received time-domain data is transformed to the frequency domain preferably through an FFT. Denote the frequency data as Y(m) where m (from 1 to $N_p$) is a reference subcarrier and $S_G$(m) is the truncated/extended GCL sequences used at those reference subcarriers, a plurality of "differential-based" values are then computed based on the pairs of reference subcarriers. These values are conveniently collected and represented in vector format (e.g., a differential-based vector). One example of a differential-based vector is $$Z(m)=Y(m)*conj(Y(m+1)), m=1,\ldots,N_p-1, \quad (3)$$

where "conj( )" denotes conjugation;
Z(m) is the "differential-based" value computed from the $m^{th}$ and $(1+m)^{th}$ reference subcarriers;
Y(m) is the frequency domain data at the $m^{th}$ reference subcarrier;

m is the index of the reference subcarrier; and
$N_p$ is the length of the reference sequence.

The form of this equation resembles that of a differential detector, so its output is considered a differential-based value. Other ways to obtain the "differential-based" vector may include, but are not limited to:

$$Z(m)=Y(m)/Y(m+1), m=1,\ldots,N_p-1, \quad (4)$$

or $$Z(m)=Y(m)/Y(m+1)/abs(Y(m)/Y(m+1)), m=1, N_p-1, \quad (5)$$

where "abs( )" denotes the absolute value. Each of these example methods for obtaining differential-based values provides information about the phase difference between input values, and some provide signal amplitude information as well, which can be helpful in fading channel conditions.

Assuming the channel between two adjacent reference subcarriers does not change drastically, which is often met as long as the spacing of reference subcarriers is not too large, Y(m+1)/Y(m) is approximately equal to $$Y(m+1)/Y(m) \approx S_G(m+1)/S_G(m) = \exp\left\{-j2\pi u \frac{k+1+q}{N_G}\right\}, \quad (6)$$

$$m = 1, \ldots, N_p - 1.$$

Thus, the class index (or sequence index) information "u" is carried in the differential-based vectors. By analyzing/processing the differential-based values, the prominent frequency component "u" can be detected which correspond to the indices of the reference sequences. To obtain those frequency domain components, a commonly used tool is the FFT. So in one embodiment, an IFFT (say T-point, T>=$N_p$-1) is taken on {Z(m)} to get $$\{z(n)\}=IFFT_T(\{Z(m)\}), m=1,\ldots,N_p-1, n=1,\ldots,T. \quad (7)$$

The peak position (say $n_{max}$) of {z(n)} gives information about u, i.e., the mapping between the identified prominent frequency component at $n_{max}$ to a corresponding transmitted sequence index is determined as $$\frac{u}{N_G} = \frac{n_{max}}{T}. \quad (8)$$

This equation embodies a known, predetermined mapping scheme between the identified prominent frequency component of the sequence and the sequence index. The sequence index corresponds with a cell ID for a cell that is the source of the received reference sequence based on the transmitted sequence index. The invention is robust to timing and frequency errors because a certain timing or frequency error will not change the frequency component of that differential-based vector.

As highlighted above, in some embodiments, the reference sequence is present on a set of subcarriers of an OFDM signal, and each differential-based value is computed between different pairs of subcarriers. In some embodiments, analyzing/processing the differential-based values to identify a prominent frequency component comprises taking a forward/inverse discrete Fourier transform of at least the differential-based values and identifying a peak in the output of the transform.

The prominent frequency component can be identified by the location of a peak in the magnitudes of the FFT output.

Conventional peak detection methods can be used, such as comparing the magnitudes of the samples out of the FFT to a threshold. If there are multiple sequences received, multiple peaks will show up.

In another embodiment, we can map the identified prominent frequency component to additional possible transmitted sequence indices corresponding to vicinity of the identified prominent frequency component. When some of the values "u" used in the system are closely spaced (e.g., adjacent), it is possible for noise or interference to cause the peak to occur close to but not at the same location as was expected for the index "u". By searching in the vicinity of the peak, we can identify more than one candidate sequence index for further checking (such as over multiple reference signal transmission periods). For example, results over multiple reference signal transmission periods can be combined, compared, majority voted, etc. to help identify the value or values of "u" that are being received. In summary, we can map the identified prominent frequency component to additional possible transmitted sequence indices corresponding to vicinity of the identified prominent frequency component.

In the case of the detecting multiple sequences, we can use the method of cancellation to improve the reliability of detecting the indices of weak sequences. In such an embodiment, we first identify the best sequences, estimate a channel response related to the known reference sequence, reconstruct the portion of the received signal contributed by the first known sequence and its channel response, remove that portion from the received signal, and then perform steps similar to those required in the first sequence detection to obtain the second sequence index. The process can go on until all sequences are detected.

In the preferred embodiment of the present invention the differential-based vector of the GCL sequences carries the class index information that can be easily detected from the frequency component of the differential-based vector (refer to (6)). Other variation of fast cell search can be devised depending on how the reference sequence is used. For example, the differential-based vector may also be obtained from two transmitted OFDM symbols, where each OFDM symbol comprises a plurality of reference subcarriers in frequency. In the first symbol, the sequence $\{S_G(m)\}$ is transmitted on the reference subcarriers. In the second symbol, a shifted version of the same sequence $\{S_G(m)\}$ may be applied on the same sets of subcarriers (e.g., shifted by one position to denote as $\{S_G(m+1)\}$. Then, a differential vector can be derived from pairs of the frequency data at these two symbols, for each reference subcarrier. Assuming the channel does not change drastically over two OFDM symbol times, the differential vector can be similarly approximated by (6).

Of course, the shifted sequence in the second symbol may occupy subcarriers that are neighbor to the subcarriers used in the first symbol, not necessarily the exactly same subcarriers. Also, the two symbols need not be adjacent to each other. In essence, as long as the channel variation between the two frequency-time locations does not change too fast, the differential vector can approximate the differential of sequence reasonably well. The class index can then be detected easily.

Although shifting by one position is the preferred implementation, shifting by two positions can also be used, noting the fact that $$S_G(m+j)/S_G(m) = \exp\left\{-j2\pi u \frac{jk + m(m+1)/2 + qj}{N_G}\right\}, \quad (9)$$

$$m = 1, \ldots, N_p - 1.$$

Figure 4:
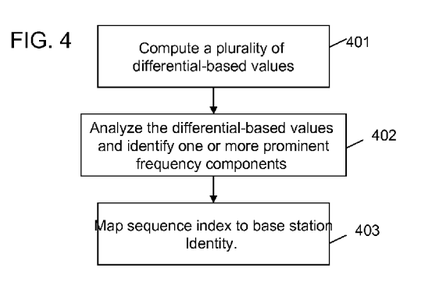
FIG. 4 is a flowchart showing the process of identifying the cell-specific references in accordance with an embodiment of the invention.

FIG. 4 shows a flow chart of the fast cell search method (base station identification) within a communication unit 103. The logic flow begins at step 401 where a reference sequence is received and differential-based value between each of a plurality of pairs of elements of the received signal is computed. As discussed above, the differential-based vector computed approximate the phase ramp information shown in (6). At step 402, the differential-based vector is analyzed/processed to identify one or more prominent frequency components. Finally, the location of the identified frequency components will be mapped to a corresponding index of the transmitted sequence (step 403) and corresponding base station identity. In particular, the sequence index corresponds with a cell ID that is the source of the received signal.

Figure 5:
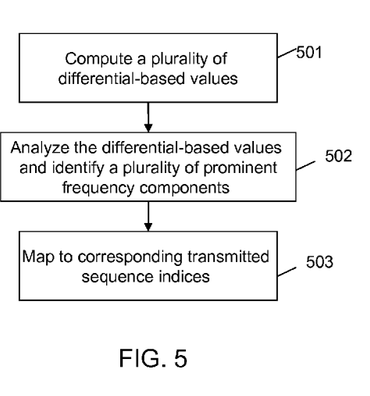
FIG. 5 is a flow chart showing the identification of multiple sequence indices.

FIG. 5 is a flow chart showing base station identification through identification of multiple sequence indices. Step 501 computes a plurality of differential-based values. Step 502 analyzes the differential-based values and identifies a plurality of prominent frequency components, and step 503 maps or translates (through a predetermined equation or other form of mapping) the prominent frequency components to corresponding transmitted sequence indices. As discussed, the transmitted sequence indices map to a particular base station that is the source of the received signal.

Figure 6:
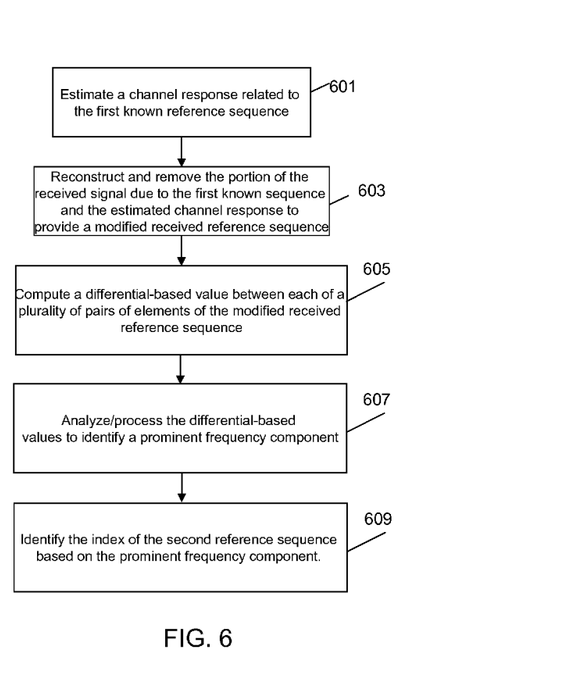
FIG. 6 is a flowchart showing the reception of multiple sequence indices and using cancellation to improve reliability.

FIG. 6 shows a flowchart for the case of detecting multiple sequences using the method of cancellation to improve the reliability of detecting the indices of weak sequences. Step 601 estimates a channel response related to the first known reference sequence (e.g., the first known reference sequence can be used a pilot to estimate the channel, or other known pilots may be used for channel estimation). Step 603 reconstructs and remove the portion of the received signal due to the first known sequence and the estimated channel response to provide a modified received reference sequence (e.g., the portion of the received signal due to the first reference signal can be computed and subtracted). Step 605 computes a differential-based value between each of a plurality of pairs of elements of the modified received reference sequence. Step 607 analyzes/processes the differential-based values to identify a prominent frequency component. Step 609 identifies the index of the second reference sequence based on the prominent frequency component.

Figure 7:
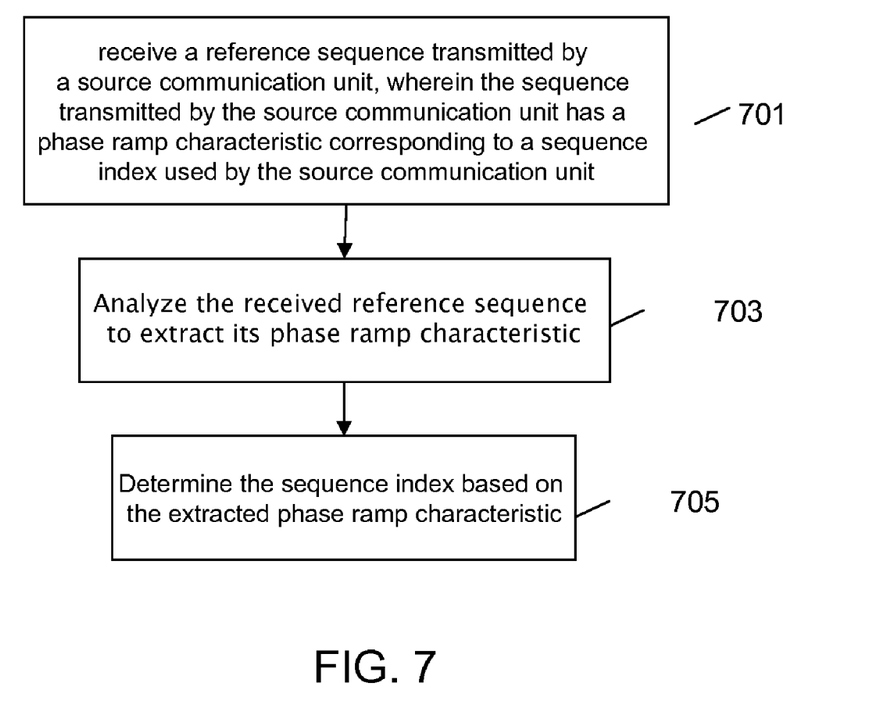
FIG. 7 shows a flowchart showing the steps necessary to map a phase ramp characteristic to a particular transmitter.

FIG. 7 shows a flowchart for an additional embodiment of the invention. In step 701, a communication unit (such as a mobile unit) receive a reference sequence transmitted by a source communication unit (such as a BS), wherein the sequence transmitted by the source communication unit has a phase ramp characteristic corresponding to a sequence index used by the source communication unit (for example, the phase ramp characteristic of a GCL-based reference signal of a particular index can be derived from equation 2). In step 703, the received reference sequence is analyzed/processed to extract its phase ramp characteristic, and in step 705, the extracted phase ramp characteristic is used as a basis for determining the sequence index, and hence the transmitter of the signal. For example, each sequence index "u" in equation 2 has its own phase ramp characteristic.

Figure 8:
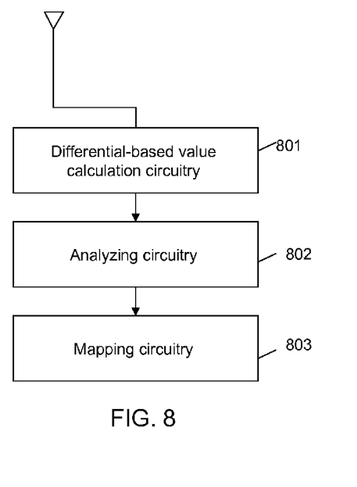
FIG. 8 is a block diagram of a remote unit in accordance with the present invention.

FIG. 8 is a block diagram of a remote unit. As shown, the remote unit comprises differential-based value calculation circuitry 801 to compute differential-based values between each of a plurality of pairs of elements of the reference sequence. Analyzing/processing circuitry 802 is included for analyzing/processing the differential-based values to identify a prominent frequency component. Finally, the remote unit comprises mapping circuitry 803, for mapping the identified prominent frequency component to one or more corresponding transmitted sequence indices based on a predetermined mapping scheme. Mapping circuitry 803 additionally identifies a base station based on the transmitted sequence index.

For the embodiment of FIG. 7, the differential-based value calculation circuitry of FIG. 8 is omitted and the analyzing/processing circuitry is utilized for analyzing/processing a received reference signal to extract its phase ramp characteristic, and the extracted phase ramp characteristic is used by mapping circuitry 803 as a basis for determining the sequence index.

In some situations multiple synchronization channels may be utilized by a communication system. For example, the 3GPP RAN WG1 is discussing cell search for Evolved-UTRA OFDM downlink. Currently a hierarchical synchronization channel (SCH) structure having a primary (P-SCH) and two secondary synchronization channels was agreed to. Such synchronization channels are illustrated in FIG. 9.

Figure 9:
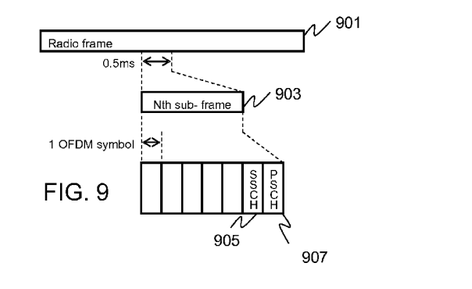
FIG. 9 illustrates the transmission of multiple synchronization channels.

As shown in FIG. 9, radio frame 901 comprises multiple subframes 903. Particularly, one or multiple subframes in the radio frame contains an S-SCH 905 and a P-SCH 907. The P-SCH and the S-SCH are time-division multiplexed and the P-SCH symbol is located in the last OFDM symbol within the subframe containing SCH and the S-SCH is located in the adjacent OFDM symbol to the P-SCH. In that hierarchical synchronization channel (SCH) structure, during operation the P-SCH is utilized for the OFDM symbol timing estimation, the frequency offset estimation and channel estimation, etc. GCL sequences are utilized as discussed above for the P-SCH. Such a GCL sequence may simply comprise a "Zadoff-Chu sequence (a particular realization of a GCL sequence). Other forms of sequences (GCL or non GCL) may be utilized as well. Moreover, there are multiple (a small number of) P-SCH sequences in the system in order to improve the accuracy of channel estimation results using the P-SCH.

Figure 10:
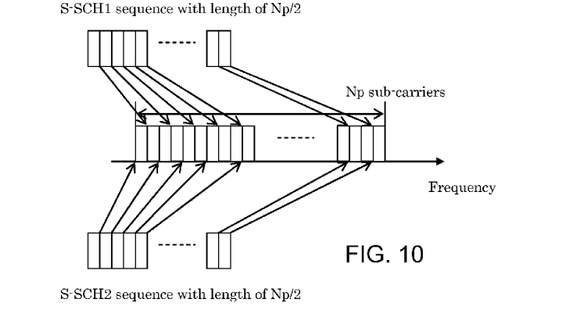
FIG. 10 illustrates the transmission of S-SCH1 and S-SCH2.

During operation the S-SCH is used to provide cell-specific information such as cell ID. To increase the amount of cell-specific information via the S-SCH without increasing the SCH overhead, a two interleaved S-SCH sequence may be employed. The two interleaved S-SCH consists of multiple S-SCH sequences. Assuming the number of S-SCH sequences is two and the number of S-SCH sub-carriers is 64, the number of indices provided by the S-SCH can be 64/2*64/2=1024. FIG. 10 shows an example of multiplexing method of S-SCH1 and S-SCH2. Two S-SCH sequences are mapped into sub-carriers alternately.

There is an issue with using a two interleaved S-SCH sequence design in cases of a synchronous network. In the case of a synchronous system, S-SCHs of neighbor cells are received simultaneously. If a mobile unit location is near the cell edge, the averaged received power of an S-SCH from each neighbor cell could be similar. In this case, a nested index combination is often detected.

In order to address the above issue, both S-SCH1 and S-SCH2 will be scrambled with scrambling codes. However, the scrambling code of S-SCH2 will be based on the S-SCH1 sequence index. In the preferred embodiment of the present invention:

The scrambling code for S-SCH is pseudo random sequence such as PN sequence;
The scrambling code index for S-SCH1 is a cell common scrambling code, in other words, a scrambling code used only by a particular cell;
The scrambling code index for S-SCH2 is determined based on the S-SCH1 sequence index; and
The number of the scrambling codes for S-SCH2 is same as number of S-SCH1 sequences.

Figure 11:
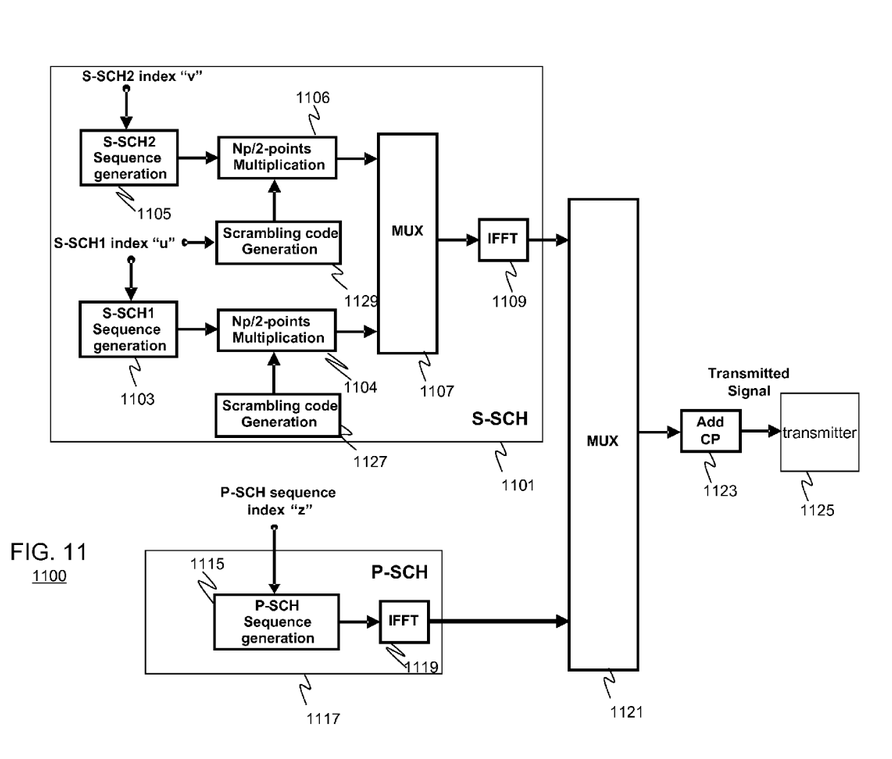
FIG. 11 is a block diagram of a transmitter transmitting S-SCH1 and S-SCH2.

FIG. 11 illustrates transmitter 1100 for transmitting both a P-SCH and two secondary synchronization channels. As is evident, transmitter 1100 comprises both S-SCH channel circuitry 1101 and P-SCH channel circuitry 1117 outputting their respective channels to multiplexer 1121. The outputs are then multiplexed via multiplexer 1121 and a cyclic prefix is added by CP circuitry 1123 prior to transmission. During operation, the P-SCH sequence is generated by sequence generation circuitry 1115 and then passed to an IFFT 1119. P-SCH sequence generator 1115 utilizes a GCL sequence with a first index (z).

S-SCH1 generation circuitry 1103 receives index u and generates an S-SCH1 sequence with having a second index (u) and outputs the S-SCH1 sequence to Np/2-points multiplication circuitry 1104 where the S-SCH1 sequence is multiplied by a cell common scrambling code. The scrambling code is generated by code generation circuitry 1127.

S-SCH2 generation circuitry 1105 receives index v and generates an S-SCH2 sequence with a third index (v) and outputs the S-SCH2 sequence to Np/2-points multiplication circuitry 1106 where the S-SCH2 sequence is multiplied by scrambling code based on the second index (u). The scrambling code is generated by code generation circuitry 1129. As is evident, the index u is input into circuitry 1129, and circuitry 1129 utilizes the index in determining the particular scrambling code to output to Np/2-points multiplication circuitry 1106. Multiplexer 1107 multiplexes the S-SCH1 and the S-SCH2 sequences as shown in FIG. 10.

The resulting signal (S-SCH sequence) is passed to IFFT circuitry 1109 and output to multiplexer 1121. The multiplexer multiplexes the S-SCH and the P-SCH channels as shown in FIG. 9.

Figure 12:
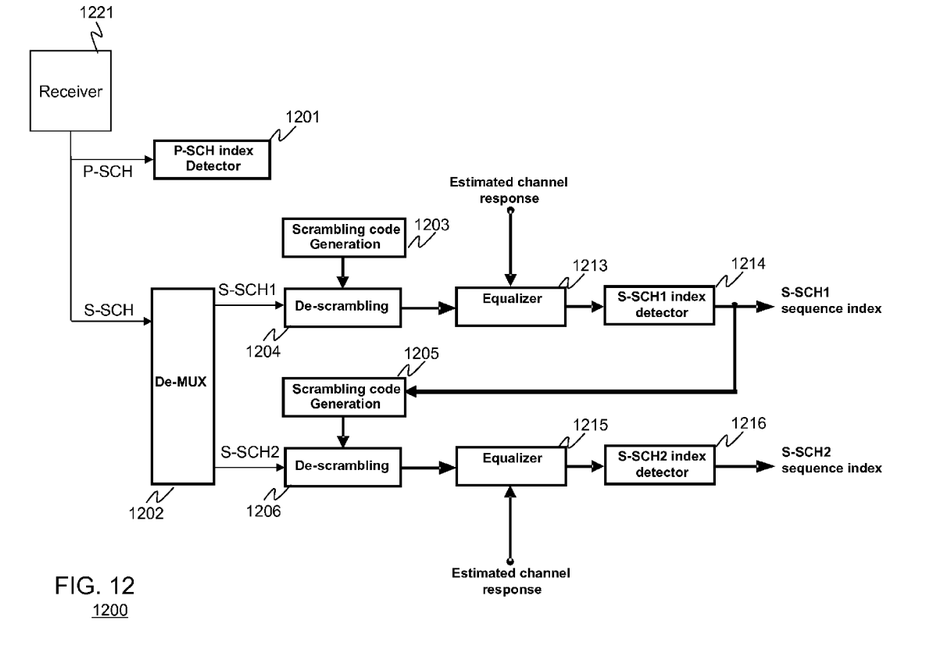
FIG. 12 is a block diagram of a receiver receiving S-SCH1 and S-SCH2.

FIG. 12 is a block diagram of receive circuitry 1200 receiving two S-SCHs and the P-SCH. During operation receiver 1221 receives both the P-SCH and the S-SCHs. P-SCH index detector 1201 detects an index of the P-SCH. De-multiplexer 1202 extracts the S-SCH1 sub-carriers and S-SCH2 sub-carriers. Scrambling code generator 1203 generates a cell common scrambling code and outputs the scrambling code to de-scrambling circuitry 1204 where the received S-SCH1 is descrambled. The resulting descrambled signal is then output to the equalizer 1213. After equalization, S-SCH1 index detector 1214 detects the S-SCH1 sequence index and passes the index to scrambling code generator 1205. Scrambling code generator 1205 generates the appropriate scrambling code based on the index and outputs the scrambling code to de-scrambling circuitry 1206 where the received S-SCH2 is descrambled. The resulting descrambled signal is then output to the equalizer 1215. After equalization, S-SCH2 index detector 1216 detects the S-SCH2 sequence index.

Figure 13:
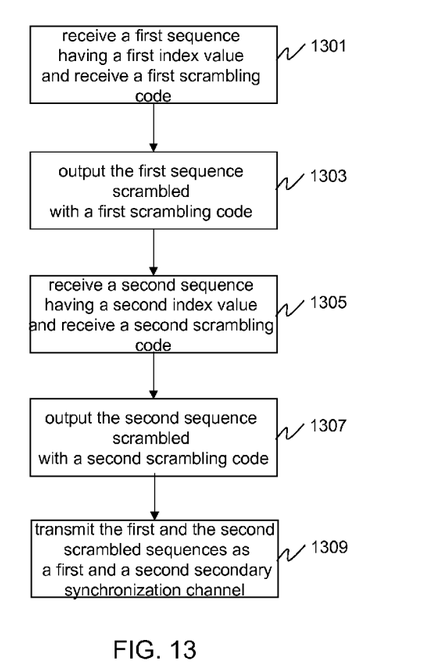
FIG. 13 is a flow chart showing operation of the transmitter of FIG. 11

FIG. 13 is a flow chart showing operation of the transmitter of FIG. 11. The logic flow begins at step 1301 where first multiplication circuitry 1104 receives a first sequence having a first index value and receives a first scrambling code. At step 1303 circuitry 1104 outputs the first sequence scrambled with a first scrambling code. At step 1305 second multiplication circuitry 1106 receives a second sequence having a second index value and receives a second scrambling code. As discussed above, the second scrambling code is based on the first index value such that the index of the second scrambling code is a function of the index of the first sequence. At step 1307, circuitry 1106 outputs the second sequence scrambled with a second scrambling code. Finally, at step 1309 transmission circuitry 1125 transmits the first and the second scrambled sequences as a first and a second secondary synchronization channel.

Figure 14:
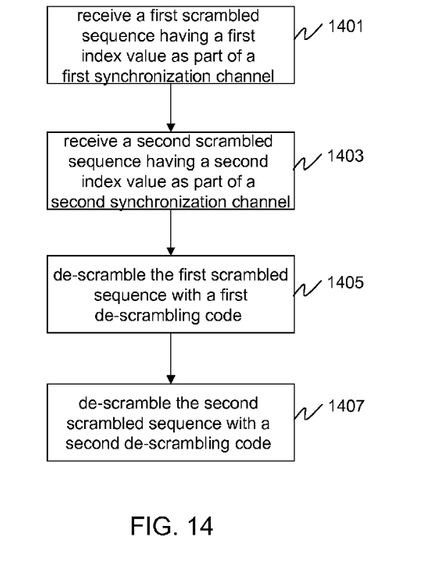
FIG. 14 is a flow chart showing operation of the receiver of FIG. 12.

FIG. 14 is a flow chart showing operation of receive circuitry 1200. The logic flow begins at step 1401 where receiver 1221 receives a first scrambled sequence having a first index value as part of a first synchronization channel. At step 1403 receiver 1221 also receives a second scrambled sequence having a second index value as part of a second synchronization channel. At step 1405 first de-scrambling circuitry 1204 de-scrambles the first scrambled sequence with a first de-scrambling code and at step 1407 second de-scrambling circuitry 1205 receives the first index value and de-scrambles the second scrambled sequence with a second de-scrambling code. As discussed above, the second de-scrambling code is based on the first index value.

While the invention has been particularly shown and described with reference to a particular embodiment, it will be understood by those skilled in the art that various changes in form and details may be made therein without departing from the spirit and scope of the invention.

We claim:

1. A method comprising the steps of:
    transmitting a primary synchronization channel (P-SCH) in a frame;
    transmitting a first secondary synchronization channel (S-SCH1) in the frame, wherein the S-SCH1 comprises a first sequence having a first index value and the first sequence is scrambled with a first scrambling code;
    transmitting a second secondary synchronization channel (S-SCH2) in the frame, wherein the S-SCH2 comprises a second sequence having a second index value and the second sequence is scrambled with a second scrambling code that is based on the first index value.

2. The method of claim 1 wherein S-SCH1 and S-SCH2 provide cell-specific information such as cell ID.

3. The method of claim 1 wherein the first and the second sequences comprises sequences taken from the group consisting of GCL sequences, Zadoff-Chu sequences, Hadmard sequences, Walsh sequences, or M-sequences.

4. The method of claim 3 wherein a GCL sequence index, Zadoff-Chu sequence index, Hadmard sequence index, Walsh sequence index, or M-sequence index act as a complete cell ID or partial cell ID or other cell-specific information.

5. A method comprising the steps of:
    receiving a primary synchronization channel (P-SCH) in a frame;
    receiving a first sequence via a first secondary synchronization channel (S-SCH1) in the frame, wherein the first sequence has a first index value and is scrambled with a first scrambling code;
    receiving a second sequence via a second secondary synchronization channel (S-SCH2) in the frame, wherein the second sequence has a second index value and is scrambled with a second scrambling code that is based on the first index value; and
    utilizing the first and the second secondary synchronization channels for determining cell-specific information.

6. The method of claim 5 wherein the first and the second sequences comprise GCL sequences, Zadoff-Chu sequences, Hadmard sequences, Walsh sequences, or M-sequences.

* * * * *